May 16, 1939.  L. BOWEN  2,158,569

FORMATION TESTER

Filed May 24, 1938  2 Sheets-Sheet 2

Inventor
Lop Bowen,
By A. M. Houghton
his Attorney

Patented May 16, 1939

2,158,569

UNITED STATES PATENT OFFICE 2,158,569

FORMATION TESTER

Lot Bowen, Bakersfield, Calif., assignor to Western Gulf Oil Company, Pittsburgh, Pa., a corporation of Delaware Application May 24, 1938, Serial No. 209,796

3 Claims. (Cl. 73—51)

This invention or discovery relates to formation testers; and it comprises an apparatus for testing productivity of oil well rock formations, including in combination a tail pipe for insertion in a well, a packer surrounding the pipe and arranged to make a seal between it and the well wall, above the producing formation, a perforate extension below the packer, a pressure recorder arranged to measure and record shut-in and flow pressures within the perforate extension, and a well-pressure recorder in free communication with fluids below the packer; all as more fully hereinafter set forth and as claimed.

In the oil production art, when a well is drilled into a formation which produces oil (the pay formation) or one which is suspected of producing oil, it is often desirable to test the productivity of the formation; that is, to determine quantitatively the amount of oil produced in a given length of time, prior to drilling deeper or to completing the well (cementing, setting permanent strainers and installing pumps). The conventional way of doing this is to lower a formation tester into the well on a string of tubing. A formation tester consists of a pipe with a packer around its lower portion, a perforated or screen-protected tail pipe extending below the packer, and a valve between the pipe and the tail pipe, so arranged that it can be opened and closed at will from the top of the well. With this arrangement, when the valve is opened any oil produced in the well below the packer flows up into the tester pipe, and is trapped therein when the valve is closed, so that on raising the tester to the surface, the amount of oil produced during the time the valve was open can be measured.

In order to measure the pressure of oil flowing up into the tubing, it is known to provide a recording pressure gage responsive to pressures within the tail pipe. Under ideal conditions, such a gage records the flow pressure correctly. However, while formation testing is simple in principle serious difficulties are encountered in practice. Using such a gage-equipped formation tester, the tests are often blank, even though there is reason to suppose that the formations tested are not barren. A blank test is one wherein no fluid or only a small amount of mud is recovered in the tubing, and where the bottom hole pressure drops substantially to atmospheric when the testing tool is opened. Theoretically this would indicate that the formations tested are barren, and often such is actually the case; but sometimes the formations are really productive and the test is spurious. It is a serious matter when a formation tester gives false tests, as this may result in passing up a highly productive sand. It has been found that blank tests are often due to plugging of the tail pipe holes during the test. Unfortunately it has been impossible to check up on the indications of the tester. When a tester is brought to the surface, the tail pipe holes are almost never plugged; any plugging is washed out during the passage of the pipe up through the column of drill fluid in the well. The pressure gage gives no helpful information, as its readings may be the same for the case of barren formation and for the case of a plugged tail pipe in a productive formation.

It has also been proposed to record the pressure in the well bottom, during the test, but, again, while this may give helpful information during an unobstructed test, it does not show up spurious tests. For example, on withdrawing the tester and finding the test blank (no fluids in the tester pipe) the gage may show the same pressure while the valve was open and while it was closed. This may mean that the formation is barren; but there is always the possibility that the formation is really productive but plugging of the tail pipe perforations kept oil from entering the sampler.

According to the present invention there is provided a testing apparatus which is adapted to indicate and clearly disclose any plugging of the strainer holes, and thereby to permit proper evaluation of the production test. Other advantages include provision for trying out various types and sizes of strainer in a well prior to setting the permanent strainer.

The apparatus comprises the combination of a testing pipe with suitable packer and a pervious lower extension such as a perforated tail pipe, and a pressure recording device arranged to measure pressure within the perforated extension, and a well-pressure recorder directly to pressures within the well below the packer. With this arrangement on completion of a test it is possible to determine exactly whether plugging has taken place, and if so, how much; and furthermore it is possible to try out various screens or strainers with a view to finding which type will give the highest degree of straining with the minimum flow restriction.

In the accompanying drawings I have shown, more or less diagrammatically, one form of a specific embodiment of apparatus within the purview of the invention. In the showing Fig. 1 is a view in elevation of my apparatus in place in a well;

Fig. 3 is a detail view, partly in vertical section and partly in elevation, of one of the pressure gages of the apparatus, of Fig. 1.

Figure 1:
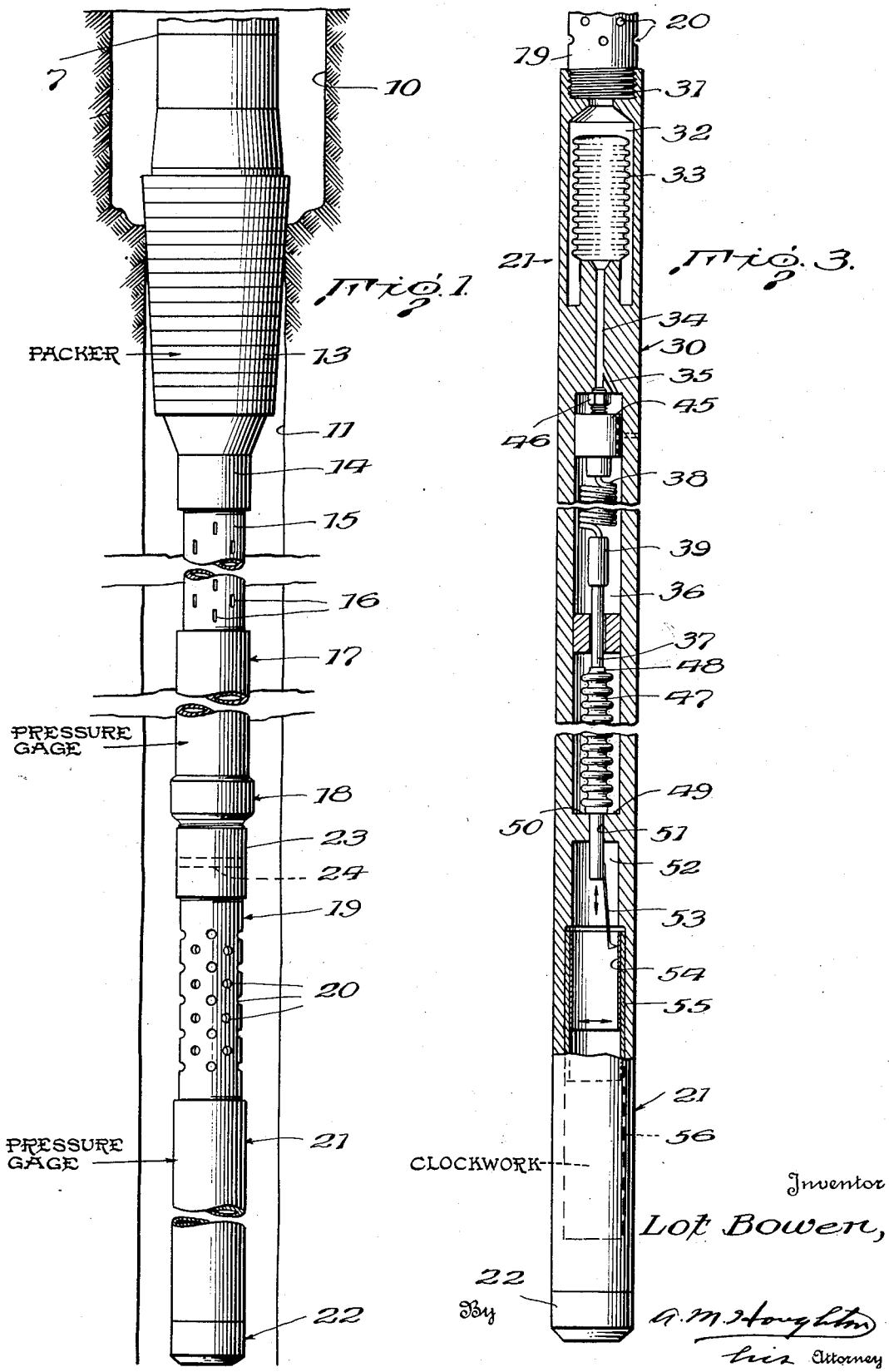

In the drawings, Fig. 1 shows the apparatus installed in testing position in a typical well, shown as having an upper bore 10 tapering down to a hole of diminished diameter 11. In drilling wells, it is customary to drill to a certain level with an ordinary large diameter bit, and then explore below that level with a smaller diameter, rat-holding bit. The lower bore 11 is a rat-hole, which is presumed to extend into potential producing formations.

Figure 2:
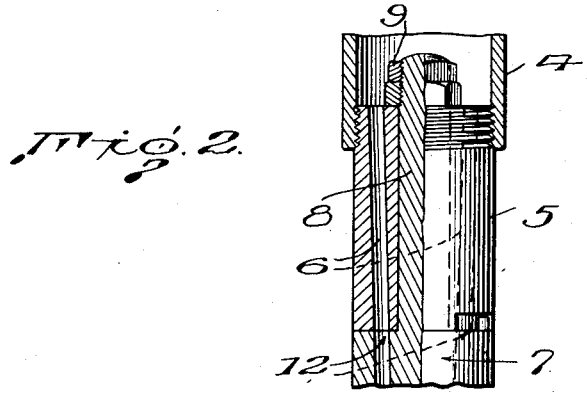
Fig. 2 is a continuation of Fig. 1 showing the valve arrangement.

The apparatus includes an elongated pipe, the lower end of which is shown at 4 in Fig. 2, attached to a cylindrical valve rotor 5 having fluid passages 6 as shown and rotatably mounted on a stationary seat member 7 by a shaft 8 and nuts 9 as shown. The seat member has corresponding passages 12, registering in one angular position with passages 6 and closed off from communication in another angular position of the rotor. By twisting the pipe 4 from the top of the well, to the right or left, the valve is closed or opened. Below member 7 is a packed 13 shown as a conical packer of resilient material making a seal at the junction of bores 10 and 11 so as to isolate the lower bore. With this arrangement, which is known per se, any liquid flowing under pressure into the lower rat-hole bore passes up into the pipe, when the valve is open. Below the packer is a reducer 14 and a perforate nipple or tail pipe extension 15 having perforations 16 of approximately the size which it is intended shall be used for the strainers in the finished well. The perforated member is of length from a foot or two up to 30 feet or more, and the perforations are often made of the order of 80-mesh or 100-mesh (that is, with slots or holes the narrowest width of which is 1/80 or 1/100 inch) but the perforation size selected is subject to wide variation dependent on particular well conditions. The perforate member 15 serves as a test member, for determining the best type of screen for use in producing oil. Below the perforated section and in free communication therewith is a recording pressure gage 17. At the lower end of the pressure gage is mounted, by a reducer 18 and coupling 23, a coarse-perforate extension 19, having holes 20 of such large size, e. g., one-half inch, that plugging thereof is quite precluded. The coupling has a disk 24 welded therein to shut off the perforated member from the upper pressure gage. Below this section is a recording pressure gage 21 responsive to pressures within section 19.

The various components of the assemblage are advantageously fastened together by threading as shown, and a protective cap 22 is provided at the bottom. The apparatus is embodied in material of the character usually employed in oil well testing apparatus, such as stainless steel or bronze.

While the assemblage is shown installed in a rat-holed well, it is equally adaptable to a uniform diameter bore by substitution of an appropriate packer in lieu of conical packer 13; for example a straight-wall expanding packer or a hook wall packer. The recording pressure gages per se form no part of the invention. Any suitable type may be used and for the sake of illustration there is shown in Fig. 3, in simplified and schematic form, a suitable pressure gage which is that described in the patent to R. J. S. Pigott et al. No. 1,998,996, arranged for continuous recording. Referring to Fig. 3, the gage comprises a barrel 30 of general cylindrical form, threaded at the top at 31 for reception of perforate member 20 and having an upper cavity 32 opening into the interior of pipe 20, as shown. Within this chamber is a soft bellows 33 of thin and flexible metal, the interior of which communicates through passages 34 and 35 with a second chamber 36. Chamber 36 and bellows 33, and the connecting passages, are filled with a suitable grade of pure oil, not shown. Within chamber 36 is a movement post 37 normally impelled upward by a rather heavy coil spring 38 attached to the post at 39 and to a sliding adjustable upper support 45. The tension on the spring is adjustable by nut and screw means 46. The lower part of the movement post is surrounded by an elongated bellows 47, fixed to the post at 48 and to a partition 49 in the barrel, as indicated at 50. The post extends down through the bellows and through an orifice 51 in the partition, making a sliding joint therewith, and the lower end protrudes into a third chamber 52 filled with air. The lower end of the post carries a springy stylus 53 arranged to engrave a record on a tubular chart 54 of aluminum or the like, retained in a rotary sleeve 55 which is turned at a slow and constant rate by clockwork 56 in the lower end of the assemblage.

Chamber 32 is in free communication with liquids in the well, entering through holes 20. Upon development of pressure within the chamber, soft bellows 33 is compressed, driving the motive oil down into chamber 36 and forcing post 37 downwards, the post acting as a piston. Bellows 47 serves to seal off chamber 36 from chamber 52 and also resists the downward motion of the post. The stylus produces a linear record of the pressure fluctuations, on the revolving chart.

For further details of the gage, the acknowledged patent should be consulted. The upper gage 17 can be of the same or of a different type.

In operation, the assemblage of Fig. 1 is introduced into the well. Assuming no plugging to take place, and the well to be shut in (i. e., the string of tubing closed off) the lower gage and the upper gage register substantially the same pressure, that is the static pressure existing in the rat-hole. On opening up the tubing, to record flow pressure, the record of the upper gage may be somewhat lower due to flow resistance through orifices 16. Under such conditions, on raising the assemblage and reading the gages it is clear that no plugging has taken place. On the other hand, should the upper gage have a markedly lower reading than the lower gage, during the time the tester valve was open, this indicates that plugging of the perforations 16 has taken place. Such a finding would indicate the advisability of re-running the test, with a larger aperture fitting substituted for fitting 15.

In a specific example illustrative of the operation of my apparatus in testing, there was an oil well in which it was desired to test the production of two 3-foot beds of oil sand lying in the interval 3390–3420 feet. An apparatus as shown was installed in the well, the packer (13) being set on the rat-hole shoulder at 3380 feet, with some 35 feet of 100-mesh slotted tail pipe, and the gage assemblage described. The valve was opened and left open for about one-half hour, during which time a fairly strong drill pipe blow (air and gas flow) occurred which subsided after a few minutes. The valve was then closed, to record the shut-in pressure. On raising the tubing, 5 barrels of muddy oil were recovered. The rat-hole capacity was 2.3 barrels.

Figure 4:
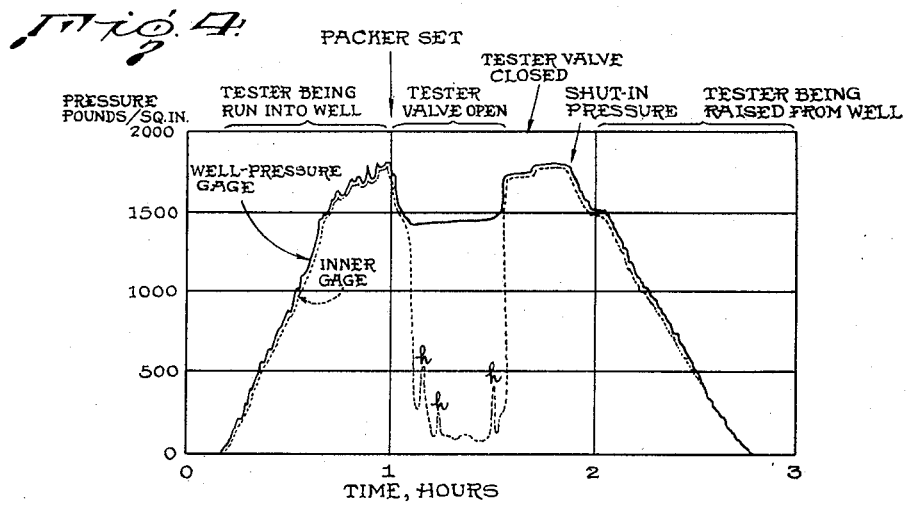
Figs. 4 and 5 are charts illustrating the operation of the apparatus.

In Fig. 4 is shown a chart of pressure versus time, taken from the gage records, the records of both gages being shown on the same chart for the sake of clarity though actually of course they were made on two separate charts. The well-pressure gage record is indicated by full lines; the inner gage record by dotted lines. The well-pressure gage record shows increasing pressure as the apparatus was lowered in the well, until the packer was set and the valve opened. Then the pressure dropped somewhat, to 1450 pounds, and remained at this value during the test. The shut-in pressure measured by this gage was 1775 pounds. The inner gage record, of pressure within the fine-perforate tail pipe, followed the well-pressure record during the lowering of the apparatus. Then when the valve was opened the pressure fell to a low value, less than 100 pounds, with a few small heads indicated at $h$. On closing the valve the shut-in pressure rose to 1750 pounds.

The two gage readings indicate clearly that plugging of the tail pipe perforations was taking place, as evinced by the great differential between the 1450 pounds well pressure recorded during the test, and the 100 pounds or less tail pipe pressure. Neither gage alone would give this information. The reading of the well-pressure gage alone would indicate a high formation pressure, but no oil, and the reading of the tail pipe pressure gage would simply indicate a low formation pressure and a barren sand. Either indication would be spurious under the circumstances.

In view of the evidence afforded by the two gage records, the test was repeated, using a different tail pipe (120-mesh perforated 4½ inch pipe) and the test was successful, 19 barrels of oil being recovered in 30 minutes through a ¼ inch bean.

Figure 5:
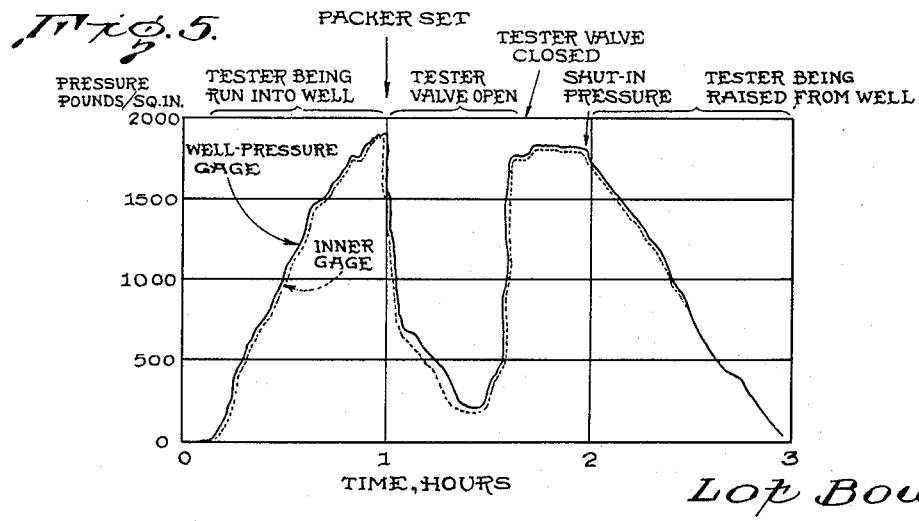

Fig. 5 is a typical chart of a formation test under favorable conditions. The tail pipe pressure record is substantially identical with the well-pressure record, except for a slight differential during the test due to flow restriction through the tail pipe perforations.

In actual use the tester has on several occasions revealed spurious tests which occurred by reason of plugging of the perforations, though no plugging whatever was evident when the tester was brought to the surface. While the tester has been described in connection with measuring oil production, it is of course equally useful in measuring water production from wet strata, as in determining the efficacy of water shut-off. The mode of operation is the same. By running one or more tests with various types of perforated tail pipes, the character of screen best suited for the finished well can be determined exactly.

What I claim is:

1. An apparatus for testing productivity of oil well formations and for determining the proper type of strainer to be used for producing oil therefrom, comprising in combination a tail pipe for insertion in a well, a packer surrounding the tail pipe and arranged to make a seal between the pipe and the walls of the well above the producing formation, a perforate test conduit extension below the packer and arranged to receive any production from the formations, a pressure recording gage arranged to measure and record pressures within the perforate extension, and a well-pressure recording gage in free communication with the well below the packer and out of communication with the interior of said test conduit extension.

2. An apparatus for testing productivity of oil well formations comprising in combination a tail pipe adapted to be lowered into a well, valve means arranged to control flows through the tail pipe, a packer surrounding the tail pipe and arranged to make a seal with the well walls above the producing formation, a fine perforate test conduit extension below the packer, a pressure recorder responsive to pressures within the perforate extension, a relatively coarse-perforate member below the first member and out of communication therewith, and a pressure recorder responsive to pressures within said coarse-perforate member.

3. An apparatus for testing productivity of oil well formations comprising in combination a tail pipe and packer for insertion into a well, a valve arranged to control flows through the tail pipe, a fine perforate test conduit extension below the tail pipe, a pressure gage below the extension and responsive to pressures therein, a relatively coarsely perforate member below the pressure gage and out of liquid communication therewith, and a well-pressure responsive gage below the coarsely perforate member and responsive to pressures therein.

LOT BOWEN.